United States Patent
Messelling

(10) Patent No.: US 6,283,356 B1
(45) Date of Patent: Sep. 4, 2001

(54) REPAIR OF A RECESS IN AN ARTICLE SURFACE

(75) Inventor: William G. Messelling, Mason, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/322,008

(22) Filed: May 28, 1999

(51) Int. Cl.$^7$ .............................. B23K 31/00; B23P 6/00; B22D 19/10
(52) U.S. Cl. ..................... 228/119; 29/889.1; 164/92.1
(58) Field of Search .................... 164/80, 92.1; 228/119, 228/226, 245, 248.1, 248.5; 29/889, 889.1, 889.6, 889.7, 889.71, 530

(56) References Cited

U.S. PATENT DOCUMENTS

| | | | |
|---|---|---|---|
| 4,004,047 | 1/1977 | Grisik ..................................... | 427/142 |
| 4,381,944 | * 5/1983 | Smith, Jr. et al. ...................... | 75/255 |
| 4,493,451 | * 1/1985 | Clark et al. ........................... | 228/119 |
| 4,830,934 | 5/1989 | Ferrigno et al. ...................... | 428/678 |
| 5,040,718 | * 8/1991 | Lee et al. ............................... | 228/119 |
| 5,071,054 | 12/1991 | Dzugan et al. ........................ | 228/119 |
| 5,156,321 | * 10/1992 | Liburdi et al. ........................ | 228/119 |
| 5,240,491 | * 8/1993 | Budinger et al. ...................... | 75/255 |
| 5,458,461 | * 10/1995 | Lee et al. ............................. | 416/97 R |
| 5,549,767 | * 8/1996 | Pietruska et al. ..................... | 148/512 |
| 5,735,448 | * 4/1998 | Draghi et al. ......................... | 228/119 |
| 5,806,751 | * 9/1998 | Schaefer et al. ...................... | 228/119 |

* cited by examiner

*Primary Examiner*—Tom Dunn
*Assistant Examiner*—Kevin P. Kerns
(74) *Attorney, Agent, or Firm*—Andrew C. Hess; Gerry S. Gressel

(57) ABSTRACT

A method for repairing a recess in an article surface comprises providing first and second metallic powders. The first powder has a first melting temperature and the second powder has a second melting temperature less than the first melting temperature. The first powder is disposed in the recess substantially to fill the recess at least to the article surface. The second powder is disposed over the first powder in an amount that will fill the recess at least to the article surface after melting and flowing the second powder into the recess. The powders are heated to a treatment temperature at least at the second melting temperature and less than the first melting temperature for a time sufficient to melt the second powder, to flow the second powder into the recess about the first powder, and to bond the second powder to a recess surface.

9 Claims, 4 Drawing Sheets

US 6,283,356 B1

REPAIR OF A RECESS IN AN ARTICLE SURFACE

BACKGROUND OF THE INVENTION

This invention relates to repair of a recess in an article surface. More particularly, it relates to repair of a recess generated during operation of a power generating apparatus, for example a gas turbine engine.

During the operation of such power generating apparatus as a gas turbine engine, components in the gas stream, particularly in the hot operating portions, are subjected to strenuous operating conditions. Such conditions include a combination of oxidation and corrosion materials and gasses, erosive airborne particles, and mechanical actions resulting from rotation of the engine. As a result, it has been observed that one or more recesses are produced in a surface of components. Recesses, as used herein, include cracks, crevices, surface erosion, dents, indentations, separations, holes in or through the substrate, etc., commonly observed by those working in the repair of gas turbine engine components.

Current methods to repair recesses include application of repair material over the recess to fill and repair the recess. For example, material missing from a recess has been provided by applying and heating weld wire, metal powder mixed with a binder, and metal tapes and shims. Metal powders used for such a purpose include metal alloys and mixtures of metal or alloy powders, some of which are described in such U.S. Patents as U.S. Pat. No. 3,700,427—Hoppin et al. (patented Oct. 24, 1972); U.S. Pat. No. 3,759,692—Zelahy (patented Sep. 18, 1973); U.S. Pat. No. 4,004,047—Grisik (patented Jan. 18, 1977); U.S. Pat. No. 4,830,934—Ferrigno et al. (patented May 16, 1989); and U.S. Pat. No. 5,071,054—Dzugan et al. (patented Dec. 10, 1991).

The success of a repair using such materials has depended on the degree to which the repair material fills the recess. Forms of powder slurries with binders currently in use have been observed to separate and result in voids in a final structure. Inadequate filling can result in a porous article portion of reduced mechanical properties and integrity.

BRIEF SUMMARY OF THE INVENTION

The present invention, in one form, provides a method for repairing a recess in an article surface, including providing first and second metallic powders with different melting temperatures, the second having a melting temperature lower than the first. The first powder is disposed in the recess substantially to fill the recess. The second powder is disposed over the first powder in an amount that at least will fill the recess up to the article surface after melting and flowing of the second powder into the recess. The powders then are heated to a treatment temperature at least at the melting temperature of the second powder and less than the melting temperature of the first powder for a time sufficient to melt the second powder, to flow the melted second powder about the first powder, and to bond the second powder to a surface of the recess. Then the material in the recess is cooled to provide a repair material in the recess.

DETAILED DESCRIPTION OF THE INVENTION

The present invention has been evaluated more particularly in connection with the repair of recesses, primarily cracks and/or erosion, in gas turbine vanes typical of hot operating gas turbine engine components. Such components on which the present invention can be used include turbine blades and vanes, shrouds, and turbine component support structures, made of high temperature superalloys based on Fe, Ni, Co or their combinations. In addition, it has been evaluated in connection with the repair, replacement and/or relocation of cooling openings through a wall of such components. The invention is of particular interest in the repair of the airfoil portion of turbine components because they experience the strenuous operating conditions found in that portion of the engine.

The method of the present invention, through the combination and order of defined metallic powders, provides within a recess flow or wicking of a lower melting metallic powder in and around a higher melting metallic powder having a melting temperature greater than a treatment temperature. The result is a substantially non-porous repair, filling a recess for integrity of the article being repaired.

The present invention will be more fully understood by reference to the embodiments of the drawings, one of which is shown in the diagrammatic, fragmentary, sectional sequence of FIGS. 1 through 6. In that embodiment, a recess is shown generally at 10 in the form of a crack in article surface 12 of metal article 14, for example a wall of a gas turbine engine airfoil. Recess 10 includes a recess surface 16 that defines an interior wall of the recess or crack.

Figure 1:
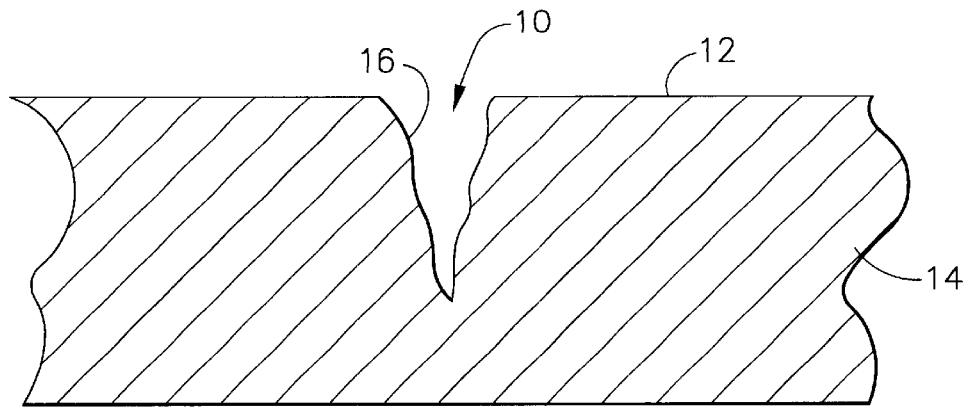
FIG. 1 is a diagrammatic, fragmentary, sectional view of a recess in the form of a crack in an article surface.
Figure 2:
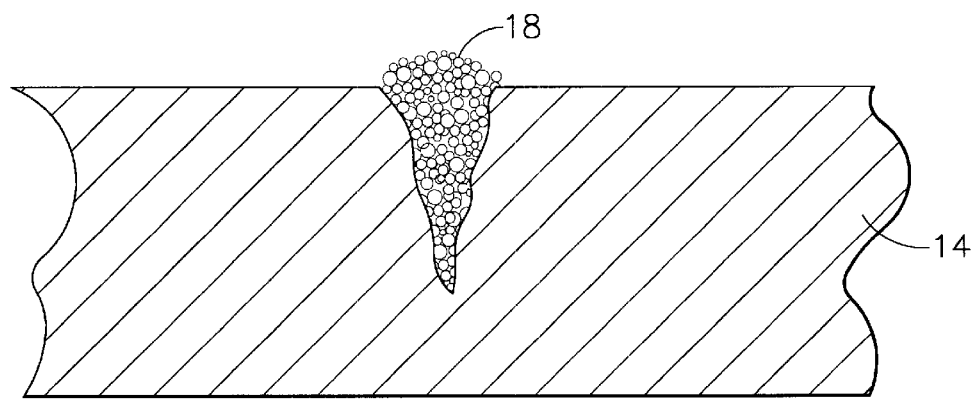
FIG. 2 is a view as in FIG. 1 in which a first metal powder is disposed in the crack.

Repair of recess 10 in that embodiment included providing a first metallic powder 18 having a first melting temperature, and disposing the first powder in the recess, as shown in FIG. 2. To assure substantially complete filling of the recess with the first powder, an external pressure or force, represented by arrow 20 in FIG. 3, was used in this evaluation. In this example, pressure was applied to the first powder using an ordinary cotton swab to press the powder into the recess. Any appropriate amount of pressure can be applied if deemed necessary to fill the recess with the first powder.

Figure 4:
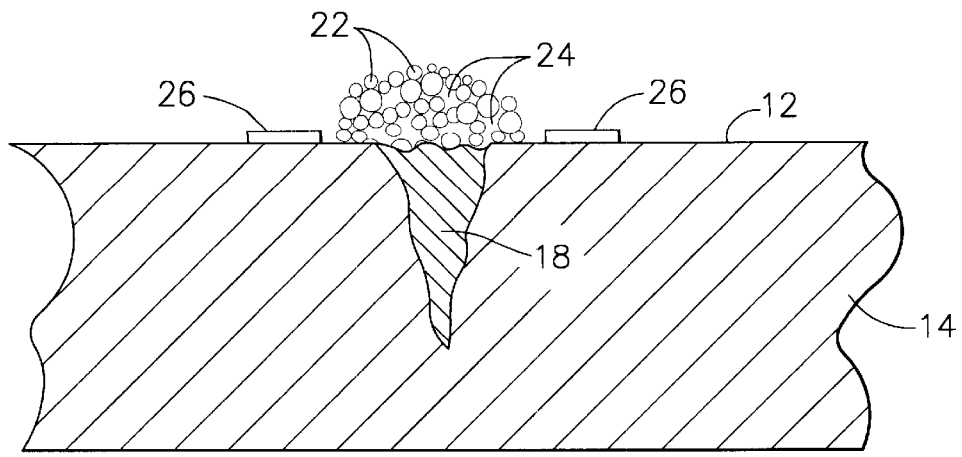
FIG. 4 is the view of FIG. 3 with a second metal powder disposed over the first powder.

A second metallic powder 22 was mixed with a liquid binder 24 of the type ordinarily used in metal brazing and that will decompose substantially without residue upon heating. This provides a second powder mixture. As shown in FIG. 4, the second powder mixture of second metal powder 22 and binder 24 was applied over first powder 18. For convenience, an ordinary commercial brazing stop-off material 26 was applied by painting about recess 10 to avoid excess flow of second powder 22 onto article surface 12 during subsequent heating and melting of the second powder.

The assembly of materials shown in FIG. 4 was heated at a treatment temperature that was at least at the melting temperature of second powder 22 and less than the melting temperature of first powder 18 and the melting temperature of article 14. Heating was conducted for a time sufficient to melt and enable flow of second powder 22 into the recess and about first powder 18. This provided a repair material 28, FIG. 5, in one form as a matrix of the melted second powder 22 about the first powder 18, with the matrix bonded with recess surface 16 of recess 10. Although the treatment temperature was less than the melting temperature of the first powder 18, an amount of diffusion between the first and second powders can occur, particularly if the second powder is of a small size. When that occurs, repair material 28 is in another form including at least the diffusion product of the first and second powders.

Figure 6:
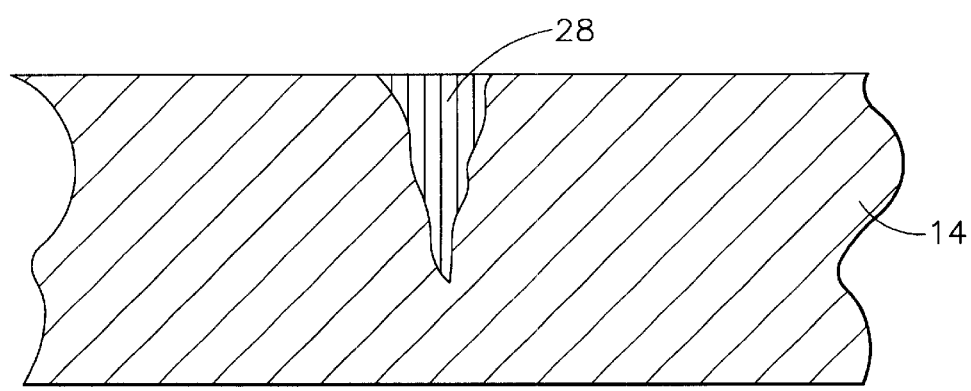
FIG. 6 is the view of FIG. 5 after removal of excess material from the article surface.
Figure 7:
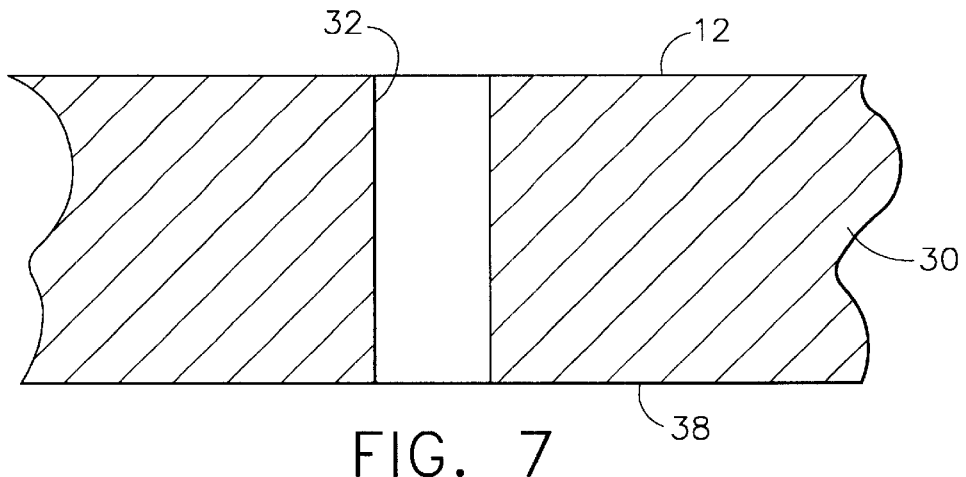
FIG. 7 is a diagrammatic, fragmentary, sectional view of an outer wall of an air cooled article showing an air cooling opening through the wall.

Excess of material 28 on article surface 12 about recess 10 was removed, for example by mechanical abrasion, as shown in FIG. 6. Practice of that embodiment of the present invention resulted in a repaired recess substantially without internal voids and with mechanical and structural integrity for the repaired article.

Another evaluation of the present invention is represented by the embodiment shown in the sequence of FIGS. 7 through 12 of the drawings. In that example, an outer wall 30 of an air cooled turbine airfoil included an air cooling opening or hole 32 through wall 30. One example of an air cooled wall in a gas turbine engine member, such as a turbine blade airfoil, is shown in U.S. Pat. No. 5,458,461— Lee et al. (patented Oct. 17, 1995). Repair of such an opening can be required, for example, because of damage to the opening, by redesign of a cooling pattern specifying repositioning of the opening, or both.

Figure 8:
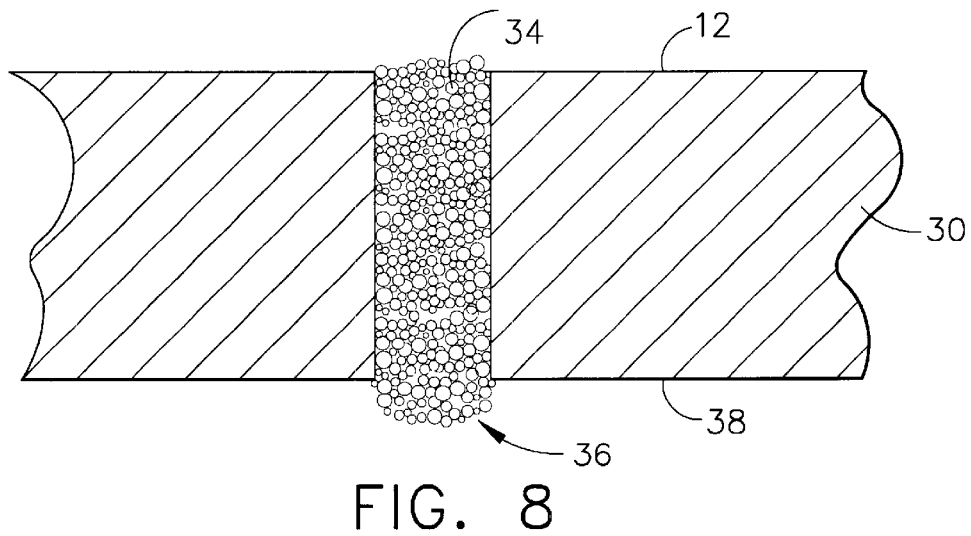
FIG. 8 is a view as in FIG. 7 in which the air cooling opening is filled with a mixture including the first metallic powder and a binder, with excess mixture extending from an inner wall surface.
Figure 9:
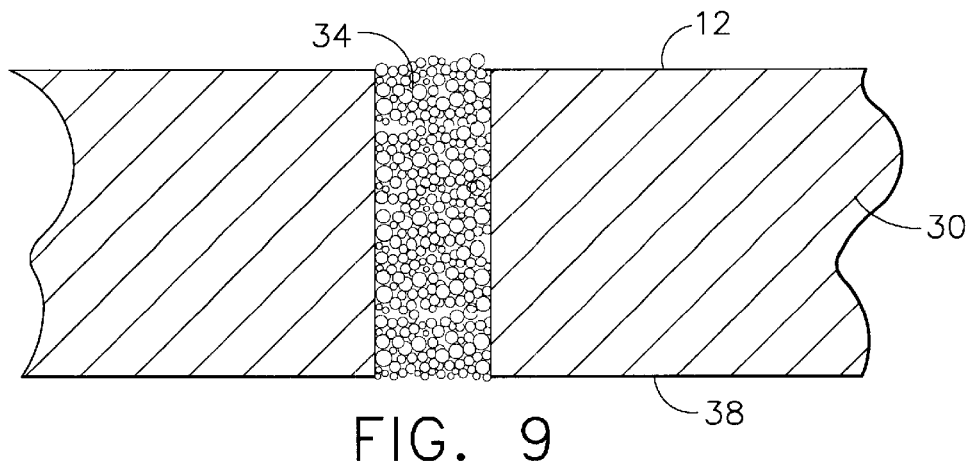
FIG. 9 is the view of FIG. 8 showing excess mixture removed from the inner wall surface.

Practice of this embodiment of the present invention was similar to that shown in the sequence of FIGS. 2 through 6, with appropriate modification or amplification associated with the article being treated. For example, because opening 32 extended through wall 30 as shown, first metallic powder 18 was mixed with a liquid binder as described above in connection with binder 24 to provide a first powder mixture 34, as shown in FIG. 8, to hold the first powder 18 within opening 32. However, application of pressure such as 20 in FIG. 3 forced first powder mixture 34 from opening 32, as shown generally at 36 on inner surface 38 of wall 30 in FIG. 8. Such excess first mixture was removed, such as by wiping with a cotton swab, to provide the condition shown in FIG. 9.

Figure 10:
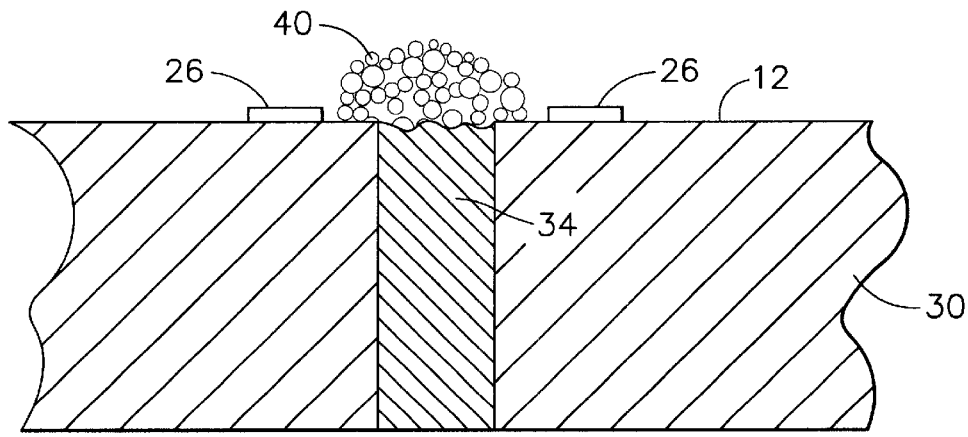
FIG. 10 is the view of FIG. 9 with a second metallic powder disposed over the first powder.
Figure 11:
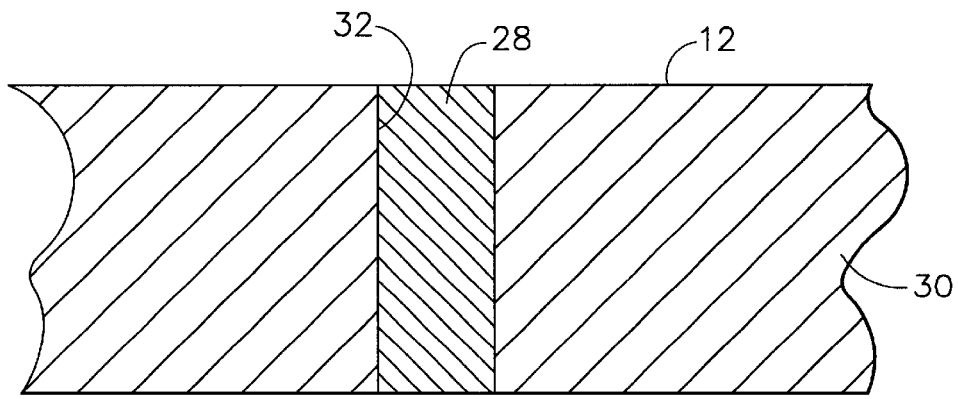
FIG. 11 is the view as in FIG. 10, comparable to the view of FIG. 6, after heating to a treatment temperature to melt and enable flow of the second powder about the first powder followed by removal of excess material from the article surface at the repaired, filled opening.
Figure 12:
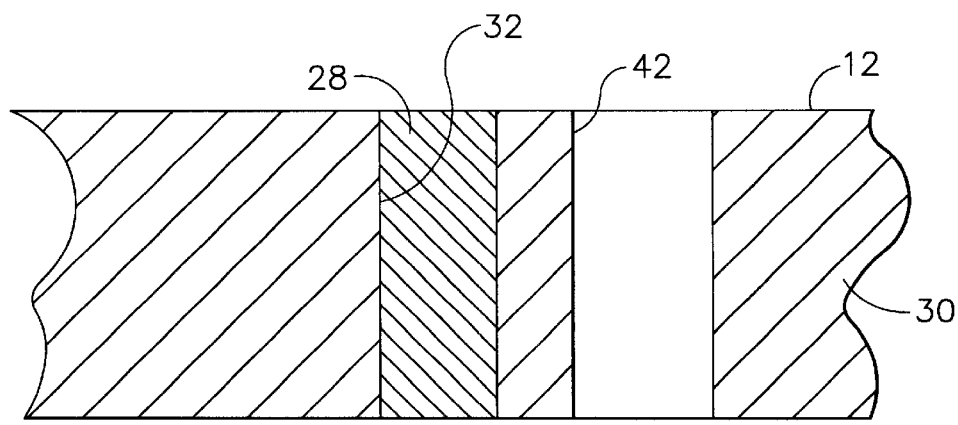
FIG. 12 is the view of FIG. 12 with a replacement air cooling opening generated through the article wall adjacent the repaired, filled opening.

A second powder mixture 40, FIG. 10, of second metallic powder 22 and binder 24 was applied over first mixture 34, as described in connection with FIG. 4 above. The assembly was heated at the treatment temperature, cooled and excess material was removed as described in connection with FIGS. 5 and 6 to provide a repair material 28 bonded within opening 32 as shown in FIG. 11. To provide a replacement air cooling opening, the region of repaired opening 32 in one example was regenerated by drilling, such as electrodischarge material removal or laser drilling commonly used in the gas turbine engine manufacturing art. In another example, the position of the air cooling opening was relocated by such drilling of a replacement opening 42 adjacent repaired opening 32.

In one specific series of examples, gas turbine engine turbine vane airfoils were observed to have cracks in the airfoil surfaces. The vane was made from a high temperature Co base superalloy commercially available as X-40 alloy, having a melting temperature greater than about 2300° F. The first metallic powder used in these examples was a powder of a high temperature Ni base superalloy sometimes referred to as Rene' N4 alloy, also having a melting temperature greater than about 2300° F. The second metallic powder used in these examples was a mixture of a plurality of distinct lower melting alloys of the general type described in the above-identified U.S. Pat. No. 4,830,934 and sometimes referred to as SA 650 alloy. The binder used was a commercial liquid material called Nicrobraze cement, generally used in connection with brazing. When mixed into a powder mixture or slurry with the metallic powders, about 10–15% by weight of the binder was used, the balance being the metallic powder.

Figure 3:
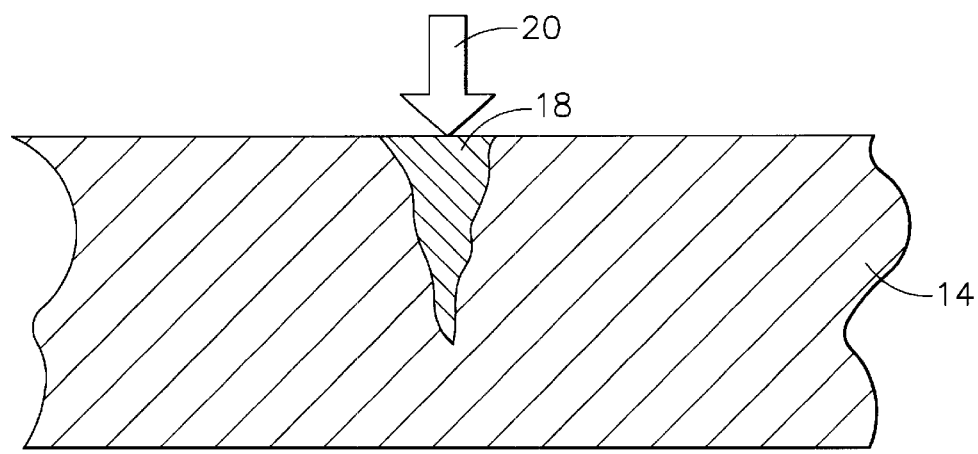
FIG. 3 is a view as in FIG. 2 in which pressure is applied to the first powder to assure filling of the crack.

Foreign surface material first was removed from the airfoil surface about the cracks. In one series of the example the dry first powder was disposed and then pressed into the cracks, as shown in FIGS. 2 and 3, using a cotton swab to press the first powder into and fill the crack substantially to the airfoil surface. Other of the series of examples used a mixture of the first powder and the binder to provide a first powder mixture. Then a second powder mixture of the second powder and binder was disposed over the first powder as shown in FIG. 4. A commercial brazing stop off material was applied with a brush to the airfoil surface about each crack outside of the second powder mixture.

Figure 5:
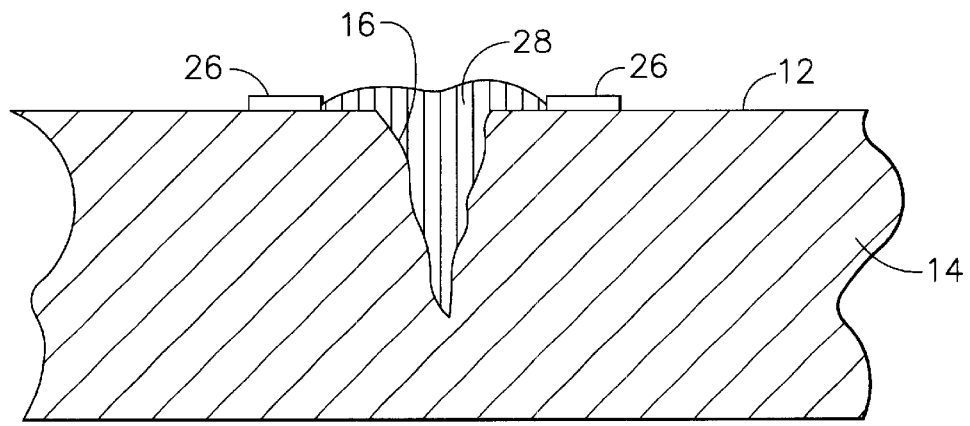
FIG. 5 is the view of FIG. 4 after heating to a treatment temperature to melt and enable flow of the second powder about the first powder.

With the materials in position as shown in FIG. 4, the airfoil was positioned in a vacuum furnace under a non-oxidizing atmosphere of argon. The airfoil then was heated at a temperature in the range of about 2200–2250° F. for a time sufficient to melt the second powder and flow the second powder about the substantially solid first powder. In this example, the airfoil was held at that temperature for about ½ hour. After removal from the furnace, the cooled structure including a repair material in the cracks appeared as shown in FIG. 5, with the stop off material blocking excess flow of repair material along the airfoil surface. Excess repair material was removed from the airfoil surface by the mechanical abrasion of grinding.

Steps of the above example were repeated in another series in which the above first and second powders both were used in a mixture with the binder to repair air cooling holes or openings through the airfoil. This series is shown in the sequence of FIGS. 8 through 11.

Pressure applied to the first powder mixture with the cotton swab to fill the hole forced an excess of the first powder mixture from the hole onto the inner surface of the airfoil. Therefore, a cotton swab with acetone was used to wipe the excess first powder mixture from the inner surface. Completion of this series, as described in the series above, resulted in a repair material filling the holes as shown in FIG. 11. Replacement air cooling holes were the drilled into the airfoil wall using commercial electrodischarge material removal apparatus.

In other evaluations, the first powder was of a high temperature Ni base superalloy sometimes called Rene' 80 alloy, forms of which are described in U.S. Pat. No. 3,615,376—Ross (patented Oct. 26, 1971). Also, the second powder has been used in the form of brazing powders of the type described in U.S. Pat. No. 3,700,427—Hoppin et al. (patented Oct. 24, 1972).

The present invention has been described in connection with specific examples, embodiments, materials, mixtures, etc. However, it should be understood that they are intended to be representative of, rather than in any way limiting on, the scope of the invention. Those skilled in the various arts involved will understand that the invention is capable of variations and modifications without departing from the scope of the appended claims.

What is claimed is:

1. A method for repairing a recess, having a recess surface, in an article surface of an article, comprising the steps of:

providing a first metallic powder having a first melting temperature;

providing a second metallic powder having a second melting temperature lower than the first melting temperature;

disposing the first powder in the recess by applying pressure to the first powder to press the first powder into the recess substantially to fill the recess at least to the article surface;

disposing the second powder over the first powder in an amount that will fill the recess at least to the article surface after melting and flowing the second powder into the recess;

heating the first and second powders to a treatment temperature at least at the second melting temperature and less than the first melting temperature for a time sufficient to melt the second powder, to flow the second powder into the recess about the first powder, and to bond the second powder to the recess surface; and, cooling to provide a repair material in the recess.

2. The method of claim 1 in which the article is made of a high temperature superalloy based on at least one element selected from the group consisting of Fe, Ni and Co.

3. The method of claim 2 in which the article is a gas turbine engine component selected from the group consisting of turbine blades, turbine vanes, turbine shrouds and turbine support structure.

4. The method of claim 2 in which:

the first metallic powder is a powder of a high temperature Ni base superalloy; and, the second metallic powder is a mixture of a plurality of distinct metallic powders.

5. The method of claim 4 in which the second powder is mixed with a binder which will decompose substantially without residue when heated at the treatment temperature to provide a second powder mixture.

6. The method of claim 5 in which the first powder is mixed with a binder that will decompose substantially without residue when heated at the treatment temperature.

7. The method of claim 6 in which: the recess is an opening through a wall of the article; and, the repair material substantially fills the opening.

8. The method of claim 1 in which the recess is an air cooling opening through an outer wall of an airfoil, the opening extending from a wall outer surface to a wall inner surface, the wall being made of a high temperature superalloy based on at least one element selected from the group consisting of Fe, Ni, and Co, and in which:

the first powder is mixed with a binder which will decompose substantially without residue to provide a first powder mixture;

the second powder is mixed with a binder which will decompose substantially without residue to provide a second powder mixture;

the first powder mixture is disposed in the opening substantially to fill the opening between the wall outer surface and the wall inner surface;

the second powder mixture is disposed over the first powder mixture; and, after cooling the opening is filled with repair material.

9. The method of claim 8 in which, after cooling, a replacement opening is generated through the wall.

* * * * *